United States Patent [19]

Schneider et al.

[11] Patent Number: 4,800,247
[45] Date of Patent: Jan. 24, 1989

[54] MICROWAVE HEATING UTENSIL

[75] Inventors: Marvin Schneider, Bryn Mawr, Pa.; Louis A. Blanco, Tuckahoe; Salvatore A. Milo, Yonkers, both of N.Y.

[73] Assignee: Commercial Decal, Inc., Mount Vernon, N.Y.

[21] Appl. No.: 34,496

[22] Filed: Apr. 3, 1987

Related U.S. Application Data

[63] Continuation-in-part of Ser. No. 826,087, Feb. 4, 1986.
[51] Int. Cl.⁴ ............................................. H05B 6/64
[52] U.S. Cl. .................... 219/10.55 E; 219/10.55 M; 219/10.55 R
[58] Field of Search ................ 219/10.55 E, 10.55 R, 219/10.55 M Primary Examiner—Robert S. Macon
Attorney, Agent, or Firm—Lerner, David, Littenberg, Krumholz & Mentlik

[57] ABSTRACT

A microwave heating utensil is provided with a microwave absorbent susceptor material which includes zinc and manganese. The susceptor material may be disposed in a layer on the surface of the body and a continuous cover layer overlying the susceptor material may be fused with the utensil body. A preformed layer comprising a susceptor-forming material including zinc and manganese, together with a glass moderator material, and a further preformed layer including the cover material in particulate form may be applied to the body by transferring these layers from a decal substrate. The continuous cover layer may be formed by fusion of the particulate cover material in heating, typically in an oxidizing atmosphere.

33 Claims, 3 Drawing Sheets

MICROWAVE HEATING UTENSIL

CROSS-REFERENCE TO RELATED APPLICATIONS

This application is a continuation-in-part of U.S. patent application Ser. No. 826,087, filed Feb. 4, 1986.

BACKGROUND OF THE INVENTION

The present invention pertains to microwave heating utensils, processes of making such utensils and decals useful in the manufacture of such utensils.

In typical microwave heating processes such as microwave cooking, microwave radiation is absorbed and converted to heat by the article to be heated. Thus, in ordinary microwave cooking microwave energy is absorbed by the food itself so that heat is generated within the food. In certain microwave heating processes, however, it is also desirable to apply externally generated heat as well. For example, meat cooked solely by internal absorption of microwave energy does not develop the desirable seared or browned exterior formed in conventional cooking processes. In cooking meat by microwave radiation, it is accordingly desirable to apply externally generated heat to the surface of the meat so as to sear or brown the meat.

Utensils incorporating microwae absorbrent materials have been made and utilized in the past for such applications. The microwave-absorbent material absorbs microwave energy and converts it into heat, thus heating the utensil. Accordingly, food placed in such a utensil and exposed to microwave energy is heated both by absorption of microwave radiation within the food and by heat transfer from the hot utensil to the food. Such utensils permit cooking and browning of meat in a typical microwave oven.

One microwave heating utensil commercially available heretofore has included a glass-ceramic body substantially transparent to microwave radiation and a continuous microwave absorbent tin-laden layer on a surface of the body. The tin-laden layer typically is formed by contacting the glass-ceramic with stannous chloride vapors. despite the extensive efforts devoted to development of microwave heating utensils and utensil-making processes heretofore, there have still been needs for further improvement. there have been particular needs for more economical utensil-making processes and for utensils which can be fabricated by such processes.

SUMMARY OF THE INVENTION

One aspect of the present invention provides a microwave heating utensil with an effective microwave-absorbent or susceptor material. The utensil preferably includes a substantially microwave-transparent body and a particulate microwave-absorbent or "lossy" susceptor material fixed to the body. Preferably, the susceptor material is electrically conductive. The susceptor material may include at least one metallic oxide and at least one metal in the unoxidized or reduced state. According to one aspect of the invention, the metallic oxide component of the susceptor material may be magnetically responsive, and may include one or more intermetallic oxides. As used in this disclosure, the term "intermetallic oxide" means a compound consisting of two or more different metals and oxygen. One useful susceptor material includes iron oxides, nickel oxides and intermetallic oxides of iron and nickel such as nickel-iron ferrite ($NiFe_2O_4$) and also includes nickel in the reduced state.

The susceptormaterial may also include reduced or free metallic zinc. According to a further, particularly preferred, aspect of the invention, the susceptormaterial may include products formed by heating a mixture of manganese and zinc in a firing operation as discussed below. These products may include some oxides of manganese and zinc. However, a substantial portion of the zinc, and preferably substantially all of the zinc, remains in the reduced state. According to this aspect of the present invention, it has been found that oxidation of zinc during formation of a zinc-based susceptor material is undesirable, and tends to reduce themicrowave response of the susceptor material. Thus, the reduced or free metallic zinc is principaly responsible for the microwave response of the susceptor material. As further discussed hereinbelow, the manganese serves to limit oxidation of the zinc and hence acts as an antioxidant. According to this aspect of the present invention, othermaterials which limit oxidation of zinc may also be employed. The term "zinc antioxidant metal" as used in this disclosure means a metal which, when used in admixture with zinc, will tend to limit oxidation of the zinc.

Preferably, the susceptor material is disposed in a thin susceptor layer on a surface of the body. According to a further aspect of the invention, the utensil includes a continuous cover layer overlying the susceptor layer so that the susceptor layer is disposed between the cover layer and the body. The cover layer is fused to the body, and protects the susceptor layer from damage such as abrasion and detergent attack. Preferably, the body and the cover layer are formed from electrically nonconductive materials which may be glass or ceramic mateials. In the present disclosure, the term "ceramic" is used in a broad sense as encompassing glass-ceramics as well as conventional ceramics. The prferred materials for the utensil body are the glass-ceramics, notably those sold under the registered trademark PYROCERAM. The preferred cover materials include glass.

The cover layer preferably is thin, and has a coefficient of thermal expansion close to that of the body. Preferably, the cover layer is fused with the body only at spaced locations on the body surface, and at least some of the interstices between particles of susceptor material in the susceptor layer are unfilled. Although the present invention is not limited by any theory of operation, it is believed that all of these features serve to minimize shear stresses caused by differences in thermal expansion of the body and layers, and hence prevent crazing and separation of the cover and susceptor layes during the repeated temperature changes incident ot use of the utensil. Further, it is believed that the unfilled interstices contibute to the microwave absorptivity of the susceptor layer.

A further aspect of the present invention provides a simple, efficient and safe process for making a microwave heating utensil. In a process according to this aspect of the invention, a susceptor layer of a particulate, susceptor-forming material is applied to a surface of the utensil body. The term "susceptor material", as used herein, refers to a material which is microwave absorbent. The term "susceptor-forming material" as used in the present disclosure includes both susceptor materials and materials which become microwave absorbent after further treatment.

Preferably, the susceptor-forming material as applied to the body includes at least one metal in the reduced state. The susceptor-forming material is heated. This heating step typically is part of a heating or "firing" operation used to fix the susceptor layer on the body. Desirably, this step is conducted in standard industrial equipment of the type normally used to fix or "fire" decorations and the like on glass orceramic ware and is conducted in an oxidizing atmosphere such as the ambient air atmosphere commonly used in industrial firing equipment. Susceptor-forming materials such as iron-nickel alloys which form magnetically responsive oxides can be partially oxidized to form the susceptor-material of the finished article in situ, in the susceptor layer on the utensil body during the heating step. These susceptor-forming materials preferably are only partially oxidized during the heating step so as to provide in the finished article a susceptor material including both a metallic oxide and a metal in the reduced state. Particularly preferred susceptor forming materials include mixtures of zinc and one or more zinc antioxidant metals such as manganese in particulate form. Desirably, the zinc in these susceptor-forming materials is protected from oxidation bythezinc antioxidant metal during the heating step. The susceptor layer as applied to the body may also include an electrically non-conductive moderator material such as glass, also in particulate form, in addition to the susceptor-forming material.

Preferably, one or more cover layers including a fusible, particulate cover material are applied so that the cover layer or layers overlie the susceptor layer. During the heating step, the cover material fuses to form the continuous cover layer of the finished article and fuses with the body so as to fix the cover layer, and hence the underlying susceptor layer, to the body, thereby joining the various layers to form a unitary utensil. Although the cover material flows to some extent during fusion, the cover material preferably does not penetrate through all of the interstices between the particles of susceptor material. The cover material accordingly does not fuse to the body over the entire surface of the body, but rather only at spaced locations on the surface, such as at the margins of the susceptor layer, at holes or openings provided in the susceptor layer, and at some of the interstices between particles in the susceptor layer.

It is believed that the cover material limits entry of oxygento the susceptor layer from the atmosphere and consequently limits oxidation of the susceptor-forming material during the heating step. When the particles of cover material fuse to form a continuous coating, entry of oxygen to the susceptor layer substantially ceases.

One or more of the cover layers may be applied in a pattern including indicia, such as decorations or directions for use of the utensil. Thus, the same heating step as employed to fuse the cover layer also serves to fix the indicia on the utensil body.

The susceptor layer may be provided as a preformed layer on a decal substrate, and may be applied to the utensil body by transferring it from the decal substrate to the body. Preferably, the cover layer or layers are also provided as preformed layers on the same decal substrate, so that all of these layers may be applied to the body in a single transferring operation. The utensil-making process according to particularly preferred embodiments of the present invention thus greatly simplifies production of the microwave heating utensil and eliminates all of the difficult steps and hazardous materials associated with prior processes.

The present invention also provides a decal for making a microwave heating utensil. The decal includes a susceptor layer attached to a decal substrate. The susceptor layer includes a particulate susceptor forming material and preferably includes a glass moderator material. The susceptor layer of the decal may also include a binder to maintain cohesion of this layer during application to the utensil body. Preferably, the decal also includes one or mroe cover layers comprising a particulate, fusible cover material. The cover layers typically also include binders, and may further include pigments.

Other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

Figure 1:
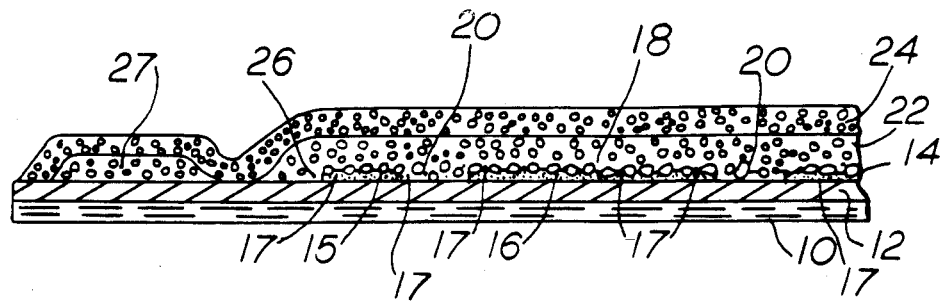
FIG. 1 is a fragmentary, schematic sectional view of a decal in accordance with one embodiment of the present invention.
Figure 3:
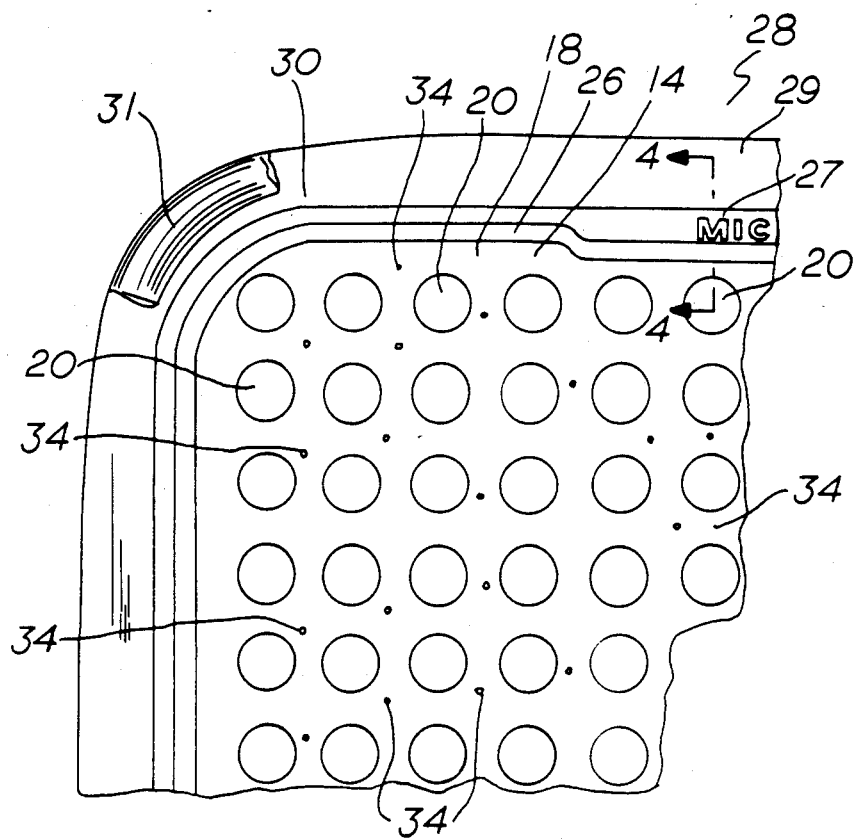
FIG. 3 is a fragmentary bottom view of a finished utensil made using the decal and process of FIGS. 1 and 2.

A decal according to one embodiment of the present invention, as illustrated in FIG. 1., includes a conventional paper decal substrate 10 and a conventional, water soluble dextrin release layer 12 on the substrate. A susceptor layer 14 is disposed atop the release layer. The susceptor layer includes a coating of a varnish binder 15 and a single layer of fine particles 16 of an ironnickel alloy susceptor-forming material adhering to the varnish base coating. Very fine particles 17 of a glass moderator material are interspersed with the susceptorforming alloy particles. The susceptor layer in the decal is formed in a pattern corresponding to the desired pattern of the susceptor layer in the finished article. As illustrated in FIGS. 1 and 3, the susceptor layer includes a unitary covered area 18 with holes 20 extending through it at regular intervals.

The susceptor layer is formed by printing the varnish on the release layer in a pattern corresponding to the desired pattern of the susceptor layer, applying a blend of the susceptor-forming alloy particles and glass moderator particles to the varnish and then drying the varnish so that the varnish holds the particles in place. After drying, loose particles are removed as by brushing. After this operation, only those alloy particles which are in direct contact with the varnish coating remain. Thus, if several layers of particles are deposited one atop the other on the varnish coating during the application step, only type lowest layer remains after the removal step. Substantially all of the particles are removed from those areas devoid of varnish, thus forming the holes 20. A process of forming a particulate layer in a desired pattern by adhesion of the particles to a tacky varnish layer is well known in the decal making art, and is commonly referred to as a "litho" process.

A first cover layer 22 comprising fine particles of a low-melting, low-expansion glass in an acrylic binder is disposed atop susceptor layer 14, portions of the first cover layer extending through the holes 20 in the susceptor layer. The first cover layer also includes a minor amount of a conventional pigment, such as oxides of iron, chromium and cobalt. The first cover layer 22 includes a continuous portion overlying the entire susceptor layer and extending beyond the margins 26 of the susceptor layer. First cover layer 22 also includes isolated portions 27 remote from the continuous portion, the isolated portions being in the shape of lettering or other indicia, as seen in the finished utensil (FIG. 3). A second cover layer 24 of composition similar to that of the first cover layer, but without the pigment, is disposed atop the first cover layer.

The cover layers typically are formed by screen printing a mixture of the glass particles in a vehicle comprising the binder and an organic solvent for the binder. The technique of applying a glass and binder layer by screen printing is well known in the art of making decals for decoration of ceramic ware and glassware.

The particle sizes and the thicknesses of the various layers are greatly exaggerated in the drawings for clarity of illustration. Typically, the alloy particles are less than about 40 microns and preferablyless than about 27 microns in diameter, whereas the glass particles in the cover layers are preferably about 2 to 4 microns in diameter. Each of the cover layers in the decal typically is less than about 10 microns thick.

Figure 2:
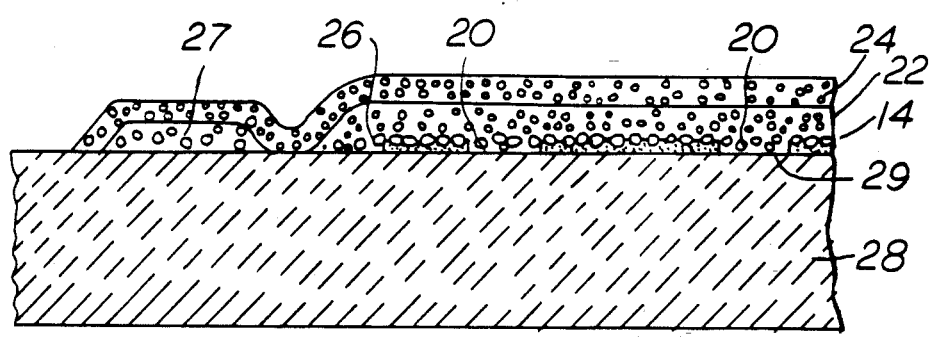
FIG. 2 is a view similar to FIG. 1 depicting a portion of a body, susceptor layer and cover layer in an intermediate stage of a process according to the present invention, using the decal of FIG. 1.

In one process according to the present invention, the decal illustrated in FIG. 1 is used to form cover and susceptor layers on a surface 29 (FIG. 2) of a glass-ceramic body 28 in the form of a conventional skillet. The decal is moistened so as to soften and dissolve release layer 12 and juxtaposed with the body so tha the substrate faces towards the body. The substrate is then removed, leaving susceptor layer 14 and cover layers 22 and 24 on surface 29. These steps are the same as employed in applying a conventional decal of the type known in the ecal art as a "water" or "slide-off" decal.

Figure 4:
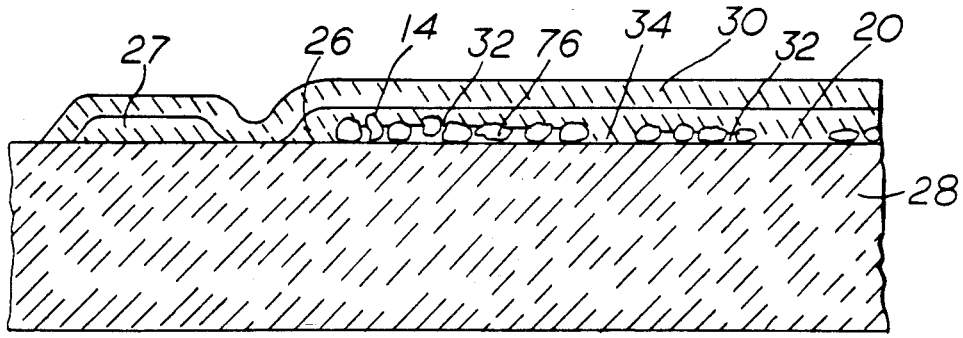
FIG. 4 is a fragmentary, schematic, sectional view on an enlarged scale, taken along line 4—4 in FIG. 3.

After the susceptor and cover layers have been applied, the body and the ocver and susceptor layers are heated under an oxidizing atmosphere such as air in a conventional oven of the type commonly utilized to fix decorative decals on ceramic ware, and are gradually cooled to room temperature. In the heating step, the varnish and acrylic binders oxidize to form gaseous oxidation products which dissipate rapidly. The glass particles in the cover layers soften and melt, and hence flow to form a single, continuous imperforate cover layer 30 (FIG. 4), the cover layer being fused to the body at the margins 26 of the susceptor layer and at each of the holes 20 in the susceptor layer and at each of the holes 20 in the susceptor laye, as schematically depicted in FIG. 4. The integral cover layer in the finished article typically has a total thickness about one half the total thickness of the two cover layers in the decal. This decrease in thickness is believed to result from loss of the binders and flow of the glass to occupy the space occupied by the binders prior to heating.

The alloy particles in the susceptor layer oxidize to yield the final susceptor material. Preferably, the metals in the susceptor layer are not completely oxidized during the heating step. Although the present invention is not limited by any theory of operation, it is believed that the cover layer serves to limit oxidation of the susceptor layer. Body 28 is substantially nonporous, so that oxygen from the surrounding atmosphere cannot enter the susceptor layer through the body. Prior to fusion of the glass particles, the cover layers are porous and permit some entry of oxygen to the susceptor layer. It is believed that, upon fusion of the glass particles, the resulting unitary cover layer 30 becomes substantially nonporous and substantially stops further transmission of oxygen to the susceptor layer. The iron in the alloy typically oxidizes to a substantially greater extend than the nickel. Thus, at least a portion of the nickel remains in the reduced or unoxidized state in the final susceptor material, after heating. The final susceptor material also includes oxides of iron and nickel. It is believed that the oxides present include intermetallic oxides of iron and nickel, i.e., compounds including iron, nickel and oxygen. It is believed that the intermetallic oxides formed include some nickel-iron ferrite or $NiFe_2O_4$.

After theheating step, the susceptor material remains in particulate form, although there may be some rearrangement of the material into different particles than originally present in the susceptor layer before heating. Thus, some of the reduced or unoxidized nickel is believed to segregate during the heating step from the oxide particles formed, to yield microscopic particles of substantially pure reduced or unoxidized nickel, which may take the form of microscopic fibers or droplets. Also, there may be some sintering or fusion of adjacent particles in the susceptor layer during the heating operation.

After heating, the interstices 32 between the particles 16 of the final susceptor layer 14 are not completely filled by glass. The glass of the cover layer may flow through some of the larger interstices 34 to join and fuse with the body at such interstices. Further, the glass moderator particles incorporated in the susceptor layer fuse during heating to deposit additional glass in the interstices between particles of susceptor material. Nonetheless, at least some of the interstices between particles of susceptor material are left unfilled. The finished article thus incorporates susceptor material in the form of an unpacked layer of particles 16 with some unfilled void spaces or interstices and also includes a continuous vitreous cover layer 30 closely overlying the susceptor layer, the cover layer being fused to the body only at spaced locations on the body surface, viz, at the margins 26 of the susceptor layer, at holes 20 and at certain of the larger interstices 34. As most clearly seen in FIG. 4, portions of the fused cover layer 30 between these spaced locations bridge over the susceptor layer but are not fused to the body. Accordingly, although the susceptor layer in the finished utensil is completely enclosed by the cover layer and the body, the particles 16 in the susceptor layer are not tightly bound in a glassy matrix.

Although the present invention is not limited by any theory of operation, it is believed that the controlled flow of the glass cover material to form a continuous layer without completely filling the interstices in the susceptor layer is related both to the relatively high viscosity of the glass at the temperatures used for the heating step and also to the effects of surface tension. Typically, the cover layer is heated to a temperature just slightly higher than the melting point of the cover material, i.e., about 690° C. to about 710° C., and maintained at that temperature for about 4 to 7 minutes before cooling. It is believed that the molten cover material does not wet the particles of the susceptor layer, so that the cover material is excluded at least from the finer interstices by surface tension. Contraction of the susceptor material during cooling may also contribute to formation of unfilled interstices in the susceptor layer. The coefficient of thermal expansion of the susceptor material typically is greater than the coefficient of expansion of the body and of the cover material. When the utensil is cooled the particles of susceptor material contract to a greater extent than the body and the cover layer. Such contraction of the particles tends to open the interstices between the particles.

In the finished utensil, the cover layer effectively retains the susceptor material on the body surface, and protects the susceptor layer during use of the utensil. Thus, the cover layer prevents abrasion of the susceptor layer. Moreover, the cover layer protects the susceptor material from further oxidation during use of the utensil, as upon heating incident to microwave exposure. The cover layer also protects the susceptor material from chemical attack, including detergent attack during cleaning, and prevents leaching of the susceptor material from the susceptor layer. Thus the cover layer greatly prolongs the useful life of the susceptor layer and also prevents contamination of the surroundings by the susceptor material.

The finished utensil may be employed in microwave cooking. A piece of meat or other food may be placed on the interior surface of the utensil body (the surface opposite from surface 29) and theutensil may be placed in a standard microwave oven. The utensil body may be supported on a shelf of the microwave oven by the feet 31 projecting from the utensil body so as to maintain surface 29, and hence the cover and susceptor layers, remote from the shelf. Upon exposure of the utensil to microwave radiation, susceptor layer 14 absorbs microwave energy and converts the same to heat thereby heating the adjacent wall portions of the utensil and hence the food in contact therewith.

Although the present invention is not limited by any theory or operation, it is believed that absorption of microwave energy and conversion of the same to heat by the susceptor layer involves both interaction of the oxide particles with the magnetic component of themicrowave energy and induction of eddy currents in the susceptor layer. It is believed that the unfilled interstices adjacent the particles of susceptor material in the susceptor layer enhance the response of the particles to magnetic excitation. It is also believed that the reduced or unoxidized metal present in the susceptor layer enhances the electrical conductivity of such layer and facilitates generation of eddy currents in the susceptor layer. Moreover, it is believed tha the cover material does not substantially insulate the particles of susceptor material from one another, and hence does not substantially impede the flow of eddy currents within the susceptor layer. These factors are believed to contribute materially to the effective conversion of microwave energy to heat which occurs when the utensil is exposed to microwave energy. Moreover, the electrically nonconductive cover layer closely overlying the susceptor layer inhibits formation of electrical arcs at the surface of the susceptor layer. The cover layer thus greatly facilitates use of susceptor materials such as particulate metallic oxides and metals which would otherwise tend to generate arcs during microwave exposure.

Preferably, the susceptor layer generates enough heat to raise the temperature of the adjacent portions of the utensil body to about 205° C. or more, hot enough to sear or brown meat. As will be readily appreciated,the utensil is subjected to repetitive thermal cycling during use. The materials included in the susceptor layer typically have coefficients of thermal expansion markedly higher than the coefficient of thermal expansion of the body material. For example, glass-ceramics of the types sold under the registered trademark PYROCERAM have coefficients of thermal expansion on the order of about $10^{-6}$ cm/cm/°C. whereas metallic nickel and nickel-iron ferrite have coefficients of expansion on the order of about $10^{-5}$ cm/cm/°C. Such a great disparity between coefficients of expansionin adjacent layers of the utensil would tend to cause significant differential expansion and hence would tend to induce substantial stresses at the interface between the layers.

It is believed, however, that these stresses are minimized by the unfilled interstices in the susceptor layer. These interstices are believed to provide room for expansion of the susceptor material particles. The temperatures attained during the use of the utensil typically are lower than the temperatures attained during the heating step used to make the utensil. Accordingly, the expansion of the susceptor particles during use typically is less than the contraction of those particles during the cooling step in manufacture. It is, accordingly, believed that such expansion does not completely close all of the unfilled interstices in the susceptor layer, and hence does not induce appreciable compressive stress in the susceptor layer. Moreover, it is believed that attachment of the cover layer to the body only at spaced locations on the body surface further minimizes stresses caused by differential expansion of the susceptor material and body. Thus, the cover layer may flex or bulge slightly away from the body when the susceptor material expands upon heating. These features of the utensil effectively compensate for differential thermal expansion of the susceptor material and the body. Thus, the susceptor material may be selected substantially without regard for its thermal expansion coefficient.

In the processes described above, an iron-nickel alloy susceptor-forming material is employed to form a susceptor material comprising oxides of iron and nickel, and nickel in the reduced state. Iron-nickel alloys with iron contents ranging from about 20% to about 80%, the remainder being nickel, and particularly alloys containing about 70% iron and about 30% nickel can be used in this way. Iron and nickel may be provided in forms other than alloy particles. Thus, the susceptor-forming material may be a mixture including fine particles of iron and fine particles of nickel. Such mixtures may be formed by reduction of mixed, gaseous, carbonyls of the iron and nickel. Although useful results may be obtained with such mixtures, susceptor materials fomed by oxidation of iron and nickel alloy particles typically provide more effective and more consistent heat generation than susceptor materials formed by oxidizing mixture of iron particles and nickel particles.

Pure zinc may also be used as a susceptorforming material. A mixture of zinc oxide and zinc in the reduced state is formed upon partial oxidation of a pure zinc susceptor-forming material.

It has been found, however, that susceptorforming materials containing mixtures of one or more zinc anti-oxidant metals such as manganese, together with zinc provide finished utensils with particularly desirable properties. Mixtures containing separate particles of manganese and zinc at zinc:manganese ratios of between about 80:8 and about 80:18 by weight are preferred. Zinc:manganese ratios of about 80:13 are particularly preferred. Although the present invention is not limited by any theory of operation, it is believed the superior performance of the zinc and manganese mixture vis-a-vis pure zinc occurs because the zinc in the mixture is less susceptible to oxidation than pure zinc. Thus, pure zinc susceptor-forming materials tend to oxidize to excess during the heating step in the manufacturing process, whereas the zinc and manganese susceptor-forming mixtures typically yield good susceptor layers in the finished utensils. Also, the zinc and manganese susceptor-forming mixtures provide properties in the finished utensil superior to those achieved with iron or iron-nickel alloys. Thus, finished susceptor layers made with the preferred zinc/manganese mixture susceptor-forming materials aremore resistant to arcing and undesired localized heating in service than are comparable layers made with iron-nickel alloys.

The thermal expansion coefficient of the cover layer typically ismatched as closely as is practicable with that of the underlying body. Thus, for use with a glass-ceramic body, the glass utilized in the cover layer preferably has a coefficient of expansion of about $60 \times 10^{-7}$ cm/cm/°C. or less. The glass utilized in the cover layer preferably has a melting point below about 710° C. and good resistance to ion replacement by the metals of the susceptor-forming material at the temperatures attained during the heating step. The cover material preferably also has good abrasion resistance and good resistance to chemical attack, particularly attack by detergents under the conditions encountered in use of the finished utensil. Glasses having the desired combination of properties are well known in the art. However, the low melting, low expansion glass commonly referred to as "fluxes" are preferred.

Further to minimize stress at the points of fusion between the cover layer and the body, the cover layer in the finished utensil should be thin. Preferably, the composite unitary cover layer resulting from fusion of glass particles in the two cover layers of the decal is between about 10 microns and about 6 microns thick, the range between about 8 microns and about 6 microns being particularly preferred. As used in this disclosure with reference to a layer,the term "thickness" means the average thickness of the layer excluding any visible holes or openings in thelayer. The thickness of the cover layer in the finished utensil depends upon the proportions of cover material and binder in the cover layers of the decal, and the thickness of these layers. These parameters may be adjusted so that the total mass of cover material per unit area in the cover layers of the decal corresponds to the mass per unit area of a fused cover layer having the desired thickness. To form a cover layer between about 6 microns and about 10 microns thick, about 2.64 mg/cm² to about 4.4 mg/cm² of glass having a density of about 4.4 gm/cm³ are required. Stated another way, the total volume per unit area of the glass particles in the cover layeres of the decal corresponds to the thickness or volume per unit area of the desired fused cover layer in the finished utensi, viz., about $6 \times 10^{-4}$ cm³/cm² to about $10 \times 10^{-4}$ cm³/cm².

The moderator included in the susceptor layer reduces the electrical conductivity of the susceptor layer, and hence moderates the temperature attained by the utensil during microwave exposure in use. The ratio of moderator to susceptor-forming material in the decal, and hence the ratio of moderator to susceptor material in the finished utensil, is selected to provide the desired temperature during use of the utensil. The moderator may be omitted entirely to provide higher temperatures during use. The glass utilized as the moderator preferably has a melting point and coefficient of expansion similar to those of the cover material. The moderator is protected from detergent attack during use of the utensil, but is intimately exposed to the metals of the susceptor material. Accordingly, glass compositions which are particularly resistant to ion replacement are preferred as moderator materials; the glass available under the designation "flux number 1803" from Corning Glass Works is particularly preferred as a moderator.

Moderators are particularly useful with zinc/based susceptor-forming materials. With the particularly preferred zinc/manganese suseptor-forming materials, the moderator preferably constitutes about 2% to about 12%, more preferably about 5% to about 9% and most preferably about 7% by weight of the susceptor layer, excluding binders prior to the heating step. Thus, the ratio of susceptor-forming material (zinc and manganese together) to moderator be weight in the susceptor layer may be about 88:12 to about 98:2, and more preferably about 91:9 to 95:5. The most preferred susceptor layers include 80 parts particulate zinc, 13 parts particulate manganese and 7 parts glass moderator material.

Figure 5:
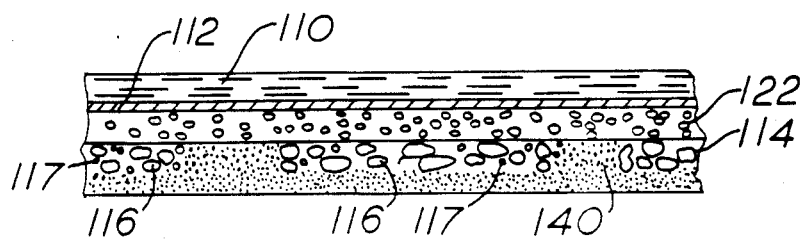

A decal according to a further embodiment of the present invention, illustrated in FIG. 5, incorporates only one cover layer 122. The single cover layer of the decal incorporates the entire mass of glass required to form a cover layer of the desired thickness in the finished article. Also, both cover layer 122 and susceptor layer 114 ar made by a silk screen process. Cover layer 122 includes a mixture of glass particles and acrylic binder similar to that employed in the cover layers of the decal of FIG. 1. Susceptor layer 114 includes metal particles 116 and moderator particles 117 in the same type of acrylic binder. Where the susceptor layer is applied by a silk screen process, the metal particles in the susceptor layer desirably should be less than about 20 microns in diameter, preferably less than 10 microns in diameter and most preferably less than about 5 microns in diameter. The moderator particles are desirably about the same size or smaller than the metal particles. With metal particles about 5 microns in diameter, the moderator particles may also be less than about 5 microns in diameter, most typically about $\frac{1}{2}$ to about 3 microns. The decal of FIG. 5 is arranged for so-called "heat release" application to the utensil body. Thus, the postion of the substate relative to the other layers is the reverse of that illustrated in FIG. 1. In the decal of FIG. 5, substrate 110 is disposed adjacent the cover layer rather than the susceptor layer. A waxy release layer 112 as commonly employed in heat release decorative decals is disposed between the substrate and cover layer. A layer 140 of a heat activatable adhesive as commonly used in heat release decorative decals is disposed on the susceptor layer 114. In use, the decal is placed on the utensil body so that adhesive layer 140 is in contact with the body surface and the decal is warmed so as to soften the wax of release layer 112 and activate the adhesive of layer 140. Substrate 110 is then peeled away from the cover layer, leaving the remainder of the decal behind on the utensil body. These steps are the same as commonly utilized to apply conventional heat release decorative decals to ceramic ware and glassware. The heating step after application of the cover and susceptor layers to the body is substantially the same as employed in the process described above. The adhesive of layer 140 oxidizes to gaseous oxidation products, which dissipate along with the oxidation products of the acrylic binders in the susceptor and cover layers.

Figure 6:
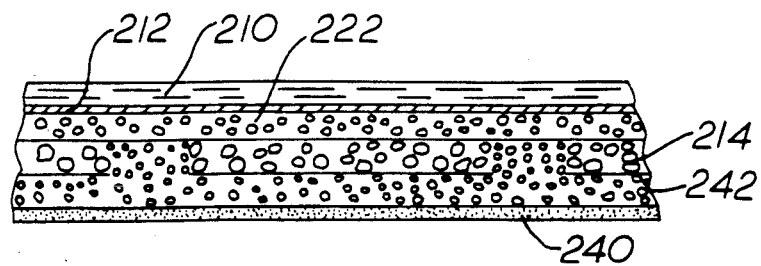
FIGS. 5 and 6 are views similar to FIG. 1 illustrating decals according to further embodiments of the present invention.
Figure 7:
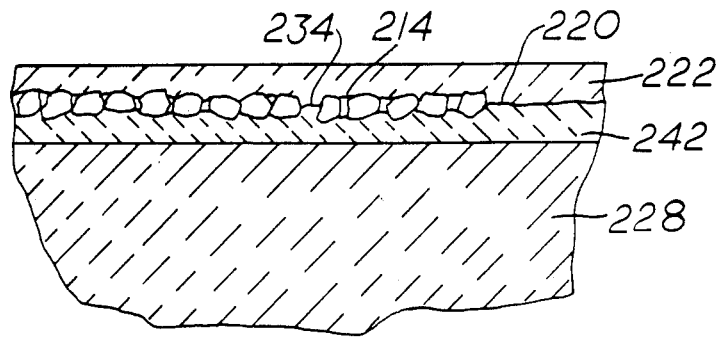
FIG. 7 is a fragmentary, schematic, sectional view depicting a portion of a utensil made using the decal of FIG. 6.

The decal illustrated in FIG. 6 is a heat release decal similar to that shown inFIG. 5 and incorporates a similar substrate 210, cover layer 222, susceptor layer 214 and adhesive layer 240. However, an underlayer 242 including a mixture of glass particles and binder similar to that employed in the cover layer is interposed between susceptor layer 214 and adhesive layer 240. When the decal is applied to the utensil body, underlayer 242 is interposed between the susceptor layer and the original surface of the body. Upon heating, the glass of underlayer 242 fuses with the body to provide a continuous vitreous underlayer on the surface of the body 228 as depicted in FIG. 7, the underlayer forming an integral part of the body. Cover layer 222 fuses with the underlayer, and hence with the body, at the spaced openings 220 in the susceptor layer and at the margins of the susceptor layer. There may be some flow of glass from the cover layer and the underlayer into the interstices between adjacent particles in the susceptor layer, and such flow may serve to fuse the cover layer withthe underlayer, and hence with the body, at some larger interstices 234 between particles in the susceptor layer. However, such flow typically is insufficient to completely fill all of the interstices between the particles of susceptor material. Accordingly, as in the embodiments descibed above, the cover layer is fused to the body only at spaced apart locations, viz, the openings, the margins of the susceptor layer and thelarger interstices.

The glass of the underlayer preferably is a low melting glass similar to that used for the cover layer. however, the glass of the underlayer may be selected to provide a coefficient of thermal expansion intermediate between those of the underlying body material and the cover material, thereby to provide a gradation in coefficient of expansion between the underlying body material and the cover material. The thickness of the underlayer in the finished utensil may be about 1.5 to about 4 microns.

Figure 8:
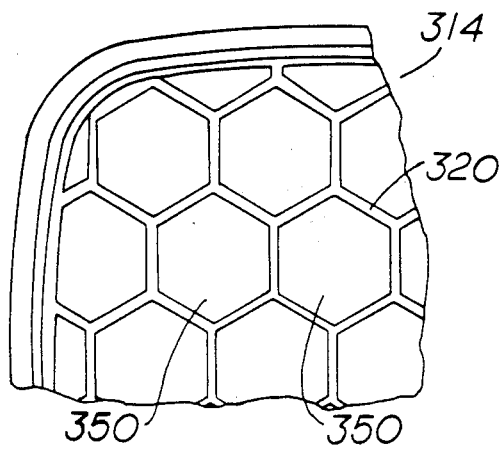
FIG. 8 is a fragmentary bottom view of a utensil according to a further embodiment of the present invention.

The utensil illustrated in FIG. 8 is similar to that illustrated in FIGS. 3 and 4. However, in the utensil of FIG. 8 the openings 320 in the susceptor layer are in the form of narrow, elongated, linear slits rather than circular holes. The linear openings are connected to one another at their ends so that the openings subdivide the susceptor layer into a plurality of zones 350, each such zone being isolated from the adjacent zone by an intervening opening. As the individual zones 350 of the cover layer are isolated from one another by the fused cover layer and body at the openings 320, eddy currents generated upon exposure of the utensil to microwave energy do not flow between the zones, but instead are confined to circulation within individual zones. As will be readily appreciated, the attern of the susceptor layer in the finished utensil can be altered as desired by varying the printing pattern of the susceptor layer in the manufacture of the decal.

Application of the cover layer, susceptor layer, and underlayer, if used, to the utensil body by means of a single decal is preferred because the decal permits application of these layers in the desired patterns and with the desired thickness or mass per unit area in a single, economical operation. Moreover, the layers on a printed decal can be inspected before application to the utensil body to prevent application of imperfect layers and thus avoid loss of utensil bodies. However, some or all of these layers may be applied to the body without using a decal. Thus, particulate susceptor-forming material or alloy may be deposited directly on the utensil body to form the susceptor layer and particulate cover material may be deposited directly over the so-formed susceptor layer. The susceptor-forming material and cover material may be deposited by any suitable technique as, for example, by silkscreen printing on the surface of the body, utilizing mixtures of binders and solvents similar to those employed in manufacture of the decal by a silkscreen printing process. Also, a vitreous underlayer may be provided on the surface of the body by subjecting the body to a glazing process as commonly employed in the ceramic industry before applying the susceptor layer and cover layer. Alternatively, the susceptor layer may be applied by means of a first decal and the cover layer may be applied by means of a second decal or by direct application of the cover material over the susceptor layer.

The substrate, release coating, adhesive and binder employed in the decal serve merely to maintain the susceptor forming material and/or cover material as coherent, performed layers and to facilitate application of these layers to the utensil body. Any conventional combination of substrate, release coating, adhesion and binder may be employed, provided that these components do not adversely affect the finished utensil or the processses occurring during the heating step. Thus, the binders, adhesives and release coating should oxidize readily during the heating step to form gaseous products rather than solid residues which may contaminate the finished utensil. In this and other respects, the considerations involved in selection of a substrate, release coating, adhesive and binder system for a decal according to the present invention are the same as those which apply with regard to a decorative decal for glass or ceramic ware. Particularly preferred heat release systems are set forth in U.S. Pats. Nos. 4,068,033 and 4,117,182, the disclosures of which are incorporated by reference herein. Water release systems may also be utilized. Further, the decal may be formed with a combustible substrate such as nitrocellulose, without any release system. In this arrangement,the susceptor and/or cover layers are applied to the body by placing the entire decal on the body, and these layers are transferred from the substrate to the body by burning the substrate, as during the heating step.

Susceptor-forming materials other than those mentioned above may also be employed. Thus, metals and combinations of metals other than iron/nickel, zinc, and zinc/manganese may be employed. Zinc ismost preferably used in conjunction with one or more zinc antioxidant metals such as manganese. Nonmetallic conductive materials can be utilized. In a variant of the process, the heating step may be conducted in an inert or reducing atmosphere. However, typical industrial heating processes, such as thefiring step used in application of decorations to ceramic articles are conducted in an air atmosphere. The standard equipment used for those firing processes is not arranged to maintain an inert or reducing atmosphere. It is thus greatly preferred to use an air atmosphere in the present process, os as to avoid the expanse of an inert or reducing atmosphere and the expense of spherical equipment for maintaining such an atmosphere.

The equilibrium temperature attained by the susceptor material, and hence the utensil body, during exposure to microwave radiation will vary with the composition of the susceptor material, the thickness of the susceptor layer and the heta losses imposed on the utensil by the food or other article to be heated. Where the susceptor material is magnetic, the magnetic response of the susceptor material, andhence the rate of heat evolution within the susceptor layer declines markedly as the susceptor material approaches its Curie temperature. As heat is continually lost from the susceptor material, the equilibrium temperature attained by a magnetic susceptor material typically will be somewhat less than the Curie temperature.

The equilibrium temperature attained by the susceptor material increases as the thickness or mass of susceptor material per unit area of the susceptor layer increases. The mass per unit area of the susceptor material may be stated as "metal mass per unit area." As used herein, the term "metal mass per unit area" refers to the mass per unit area of the metal or metals in the susceptor layer, and hence excluedes the mass of the oxygen incorporated in the susceptor layer. The area of the susceptor layer, as referred to herein, excludes the area of any visible holes or openings. For a susceptor material formed by in situ oxidation of a reduced metal susceptor forming material, the metal mass per unit area in the susceptor layer of the utensil will be equal to the mass of suseptor-forming material per unit area initially applied to the utensil body.

The desired equilibrium temperature varies with the intended use of the utensil. For microwave cooking, equilibrium temperatures between about 260° C. and about 326° C. typically are desired. Susceptor layers formed by partial oxidation of an iron-nickel alloy susceptorforming material and having a metal mass per unit area between about 6 mg/cm$^2$ and about 18 mg/cm$^2$ and most preferably about 12 mg/cm$^2$ provide equilibrium temperatures within this desired range and accordingly are preferred for cooking utensils. Susceptor layers formed by partial oxidation of a zinc susceptor-forming material, and containing a glass moderator in an amount equal to about 0.35 to about 0.5 times the metal mass of the susceptor layer, provide equilibrium temperatures within the desired range at a metal mass per unit area of between about 5 mg/cm$^2$ and about 15 mg/cm$^2$, most preferably about 10 mg/cm$^2$. With a susceptor layer formed from the preferred zinc and manganese mixture susceptor-forming material, and containing the preferred amounts of glass moderator used with this material, the metal mass per unit area (the mass per unit area of the zinc and manganese together) preferably is about 4 mg/cm$^2$ to about 10 mg/cm$^2$, and more preferably about 6.3 to about 7.9 mgcm$^2$.

The present invention may be used with utensil bodies incorporating materials other than the glassceramic materials referred to above. For example, utensil bodies formed from conventional ceramics or glass may be employed in the present invention. Although glass is preferred as the cover material and underlayer material, other fusible, nonconductive materials may be used. Thus, ceramic compositions may be employed as cover mateials, the ceramic being fired or partially fused during the heating step. Also, the cover material may include a thixotropic agent to limit its flow during the heating step. Suitable thixotropic agents for use with a glass cover material include fine particles of a relatively high melting glass which do not melt at the temperatures employed in the heating step. Preferably, the body material, the cover material and the underlayer material, if employed are substantially transparent to microwaves, so that microwave energy incident on the utensil will reach the susceptor layer.

The examples set forth below illustrate certain aspects ofthe present invention:

EXAMPLE 1

A dextrin coated substrate paper is printed with a 3 micron thick layer of a linseed oil varnish in a pattern comprising a continuous generally octagonal spot about 21 cm wide with holes about 1.5 mm indiameter extending through the varnish layer, the holes being arranged in a rectilinear grid pattern as illustrated in FIG. 4 at 2 mm center to center spacing. A 70% iron-30% nickel alloy powder having a maximum particle size of about 27 microns is applied to the tacky varnish coating. Loose metal particles are removed byapplying flour to the metal covered varnish layer and brushing off the flour. A vehicle is made by mixing 30 parts by weight methyl methacrylate, 10 parts by weight dodecal zenesulfonic acid and 60 parts by weight of an aromatic hydrocarbon solvent. A first glass coating mixture is made by mixing one part by weight of the vehicle with one part by weight of Corning No. 1803 low expansion, low melting glass flux having a mean particle size of about 3 microns together with 0.01 parts by weight chromium oxide black pigment having a similar particle size. A substantially continuous layer of this first mixture is applied by screen printing through a 330 mesh screen so that the continuous layer covers the entire area encompassed by the alloy layer and extends about 2 mm beyond the alloy layer at the margins thereof. Additional portions of the first or pigmented mixture are deposited directly onto the dextrin layer in areas remote from the alloy layer, these further portions being in the shape of letters. Application of the first coating is controlled so that, after the first coating is cured by drying in air to evaporate the solvent, the resulting cover layer of glass in acrylic binder is about 6 microns thick. A second glass coating mixture is prepared according to the same formulation as used for the first glass coating mixture, save that the pigment is omitted. This second mixture is applied over the cured first cover layer sing a 390 mesh screen and cured by evaporation of the solvent to form a second cover layer, also about 6 microns thick. The decal formed by these steps is substantially as illustrated in FIG. 1.

The decal is moistened and juxtaposed with a glass-ceramic skillet having a generally square bottom wall about 25 cm on a side. The substrate of the decal is removed, leaving the susceptor or alloy layer and the cover layers of the decal on the outside or non-food contacting surface of the skillet bottom wall. The skillet, with the susceptor and cover layers thereon, is passed through a conventional, conveyorized oven wherein the skillet is heated in air to about 700° C. over a period of about 40 minutes, held at about 700° C. for about 6 minutes and then cooled to room temperature over a period of about 10 minutes.

The resulting microwave heating skilled may be effectively heated to meat browning temperature by exposure to microwave radiation in a conventional microwave oven as commonly utilized for home cooking purposes. The skillet is substantially unaffected by repeated thermal cycling. The microwave absorbent susceptor layer is effectively protected from abrasion and from detergent attach by the fused, continuous glass cover layer. The lettering resulting from the letter-shaped portions of the first or pigmented cover layer in the decal provides permanent indication as to directions for use. These indicia are likewise resistant to damage during use.

EXAMPLE 2

A decal is fabricated using a mixture of 80 parts by weight metallic zinc dust and 13 parts by weight manganese dust each having an arithmetic mean particle size of less than about 5 microns. The zinc dust and manganese dust are glended with 13 parts by weight particles of Corning No. 1803 flux inparticles smaller than about 2 microns. These components are mixed with an acrylic binder to provide a susceptor layer coating composition, including about 1 part by weight binder per part by weight zinc and manganese, taken together. The susceptor layer of the decal is fabricated by screen printing this coating composition on the dextrin-coated release paper so as to provide about 7 mg/cm$^2$ of zinc and manganese, taken together. In other respects,the decal fabrication process is the same as employed in Example 1. The decal is applied to a utensil body and heated by the same processes as employed in Example 1. The resulting utensil has microwave heating and thermal cycling properties, abrasion resistance and detergent resistance similar to the utensil of Example 1. However, the utensil of this example resists formation of arcs and localied hot spots during exposure to microave radiation beter than the utensil of Example 1.

What is claimed is:

1. A microwave heating utensil comprising a substantially microwave-transparent body and a particulate susceptor material fixed to said body, said susceptor material comprising zinc and one or more zinc antioxidant metals.

2. A microwave heating utensil comprising a substantially microwave-transparent body and a particulate susceptor material fixed to said body, said susceptor material comprising zinc and manganeses.

3. A utensil as claimed in claim 2 wherein said susceptor material is disposed in a susceptor layer on a surface of said body.

4. A utensil as claimed in claim 3, further comprising an electrically non-conductive moderator in said susceptor layer.

5. A microwave heating utensil as claimed in claim 4 further comprising a continuous cover layer of a substantially microwave-transparent cover material closely overlying said susceptor layer, said cover layer being fused to said body.

6. A utensil as claimed in claim 5 wherein said body is formed from a glass or ceramic material and said cover material consists essentially of a glass or ceramic material.

7. A utensil as claimed in claim 6 wherein said body is formed from a glass-ceramic material and said cover layer consists essentially of glass.

8. A utensil as claimed in claim 4 wherein the ratio of zinc to manganese in said susceptor material is between about 80:8 and about 80:18 by weight.

9. A utensil as claimed in claim 8 wherein said ratio of zinc to manganese is about 80:13.

10. A utensil as claimed in claim 8 wherein the metal mass per unit area of said susceptor layer is about 4 mg/cm$^2$ to about 10 mg/cm$^2$.

11. A method of making a microwave heating utensil comprising the steps of:
    (a) providing a body;
    (b) applying a susceptor layer of a particulate susceptor-forming material including zinc and one or more zinc antioxidant metals over a surface of said body;
    (c) applying a cover layer of a particulate fusible cover material over said susceptor layer;
    (d) heating said layers so as to fuse said cover material to form a continuous cover layer and ufse said cover layer to said body, thereby forming a unitary utensil; and
    (e) cooling said utensil.

12. A microwave heating utensil made by a method as claimed in claim 11.

13. A method of making a microwave heating utensil comprising the steps of:
    (a) providing a body;
    (b) applying a susceptor layer of a particulate susceptor-forming material including zinc and manganese over a surface of said body;
    (c) applying a cover layer of a particulate fusible cover material over said susceptor layer;
    (d) heating said layers so as to fuse said cover material to form a continuous cover layer and fuse said cover layer to said body, thereby forming a unitary untensil; and
    (e) cooling said utensil.

14. A method as claimed in claim 13 wherein both said susceptor layer and said cover layer are provided as performed layers on a decal substrate and are applied to said body by transferring said performed layers from said decal substrate to said body.

15. A method as claimed in claim 13 wherein said body is formed from a glass or ceramic material and said cover material consists essentially of a glass or ceramic material.

16. A method as claimed in claim 13 wherein said susceptor-forming material includes zinc and manganese in the reduced state, and said heating step is performing in an oxidizing atmosphere.

17. A method as claimed in claim 16 wherein said susceptor layer includes a particulate fusible moderator, in addition to said susceptor-forming material, said moderator being fused during said heating step.

18. A method as claimed in claim 17 wherein said susceptor-forming material consists essentially of zinc and manganese.

19. A method as claimed in claim 18 wherein the ratio of zinc to manganese by weight in said susceptor-forming material is about 80:8 to about 80:18.

20. A method as claimed in claim 19 wherein said moderator consists essentially of glass and the ratio of said susceptor-forming material to said moderator by weight in said susceptor layer prior to said heating step is between about 88:12 and about 98:2.

21. A method as claimed in claim 20 wherein said ratio of zinc to manganese is said susceptor-forming material is about 80:13.

22. A method as claimed in claim 21 wherein said ratio of susceptor-forming material to moderator is about 93:7.

23. A method as claimed in claim 22 wherein the mean particle sizes of said susceptor-forming material and said moderator are about 20 microns or less.

24. A microwave heating utensil made by a method as claimed in claim 23.

25. A decal for making a microwave heating utensil comprising a substrate, and a susceptor layer comprising a particulate susceptor-forming material including zinc and one or more zinc antioxidant metals secured to said substrate.

26. A decal for making a microwave heating utensil comprising a substrate, and a susceptor layer comprising a particulate susceptor-forming material including zinc and manganese secured to said substrate.

27. A decal as claimed in claim 35 further comprising a cover layer including a particulate fusible cover material consisting essentially of a glass or ceramic material disposed adjacent said susceptor layer.

28. A decal as claimed in claim 27 wherein said susceptor layer includes a particulate, fusible electrically non-conductive moderator in addition to said susceptor-forming material.

29. A decal as claimed in claim 28 wherein the ratio of zinc to manganese by weight in said susceptorforming material is about 80:8 to about 80:18.

30. A decal as claimed in claim 29 wherein said moderator consists essentially of glass and the ratio of said susceptor-forming material to said moderator by weight in said susceptor layer prior to said heating step is between about 88:12 and about 98:2.

31. A decal as claimed in claim 30 wherein said ratio of zinc to manganese in said susceptor-forming material is about 80:13.

32. A decal as claimed in claim 31 wherein said ratio of susceptor-forming material to moderator is about 93:7.

33. A decal as claimed in claim 32 wherein said susceptor layer includes between about 4 mg/cm$^2$ and about 10 mg/cm$^2$ of said susceptor-forming material.

* * * * *

UNITED STATES PATENT AND TRADEMARK OFFICE
CERTIFICATE OF CORRECTION

PATENT NO. : 4,800,247

DATED : January 24, 1989  Page 1 of 4

INVENTOR(S) : Schneider et al.

It is certified that error appears in the above-identified patent and that said Letters Patent is hereby corrected as shown below:

```
Column 1, line 27, "microwae" should read --microwave--.
Column 1, line 27, "absorbrent" should read --absorbent--.
Column 1, line 43, "despite" should read --Despite--.
Column 1, line 46, "there" should read --There--.
Column 2, line 3, "susceptormaterial" should read --susceptor material--.
Column 2, line 5, "susceptormaterial" should read --susceptor material--.
Column 2, line 14, "themicrowave" should read --the microwave--.
Column 2, line 16, "principaly" should read --principally--.
Column 2, line 38 "prferred" should read --preferred--.
Column 2, line 53 "layes" should read --layers--.
Column 2, line 54, "ot" should read --to--.
Column 2, line 56, "contibute" should read --contribute--.
Column 3, line 8, "orceramic" should read --or ceramic--.
Column 3, line 13, "susceptor-" should read --susceptor--.
Column 3, line 14, "in situ" should read --in situ--.
Column 3, line 24, "bythezinc" should read --by the zinc--.
Column 3, line 49, "oxygento" should read --oxygen to--.
Column 4, line 52 "ironnickel" should read --iron-nickel--.
Column 4, line 55, "ceptorforming" should read --ceptor-forming--.
Column 5, line 4, "type" should read --the--.
Column 5, line 37, "preferablyless" should read --preferably less--.
```

UNITED STATES PATENT AND TRADEMARK OFFICE
CERTIFICATE OF CORRECTION

PATENT NO. : 4,800,247

DATED : January 24, 1989

INVENTOR(S) : Schneider et al.

It is certified that error appears in the above-identified patent and that said Letters Patent is hereby corrected as shown below:

```
Column 5, line 47, "tha" should read --that--.
Column 5, line 52, "ecal" should read --decal--.
Column 5, line 54, "ocver" should read --cover--.
Column 5, line 65, cancel "and at each of".
Column 5, line 66, cancel "the holes 20 in the susceptor laye".
Column 6, line 20, "extend" should read --extent--.
Column 6, line 29, "theheating" should read --the heating--.
Column 7, line 39, "theutensil" should read --the utensil--.
Column 7, line 53, "themi-" should read --the mi---.
Column 7, line 62, "tha" should read --that--.
Column 8, line 22, "expansionin" should read --expansion in--.
Column 8, line 68, "mixture" should read --mixtures--.
Column 9, line 1, "susceptorforming" should read --susceptor-forming--.
Column 9, line 5, "susceptorforming" should read --susceptor-forming--.
Column 9, line 27, "aremore" should read --are more--.
Column 9, line 31, "ismatched" should read --is matched--.
Column 9, line 57, "thelayer" should read --the layer--.
Column 10, line 3, "utensi," should read --utensil,--.
Column 10, line 43, "ar" should read --are--.
Column 11, line 35 "withthe" should read --with the--.
Column 11, line 43, "thelarger" should read --the larger--.
```

UNITED STATES PATENT AND TRADEMARK OFFICE
CERTIFICATE OF CORRECTION

PATENT NO. : 4,800,247

DATED : January 24, 1989

INVENTOR(S) : Schneider et al.

It is certified that error appears in the above-identified patent and that said Letters Patent is hereby corrected as shown below:

Column 11, line 45, "however" should read --However--.
Column 11, line 68, "attern" should read --pattern--.
Column 13, line 1, "thefiring" should read --the firing--.
Column 13, line 6, "os" should read --so--.
Column 13, line 7, "expanse" should read --expense--.
Column 13, line 14, "heta" should read --heat--.
Column 13, line 17, "andhence" should read --and hence--.
Column 13, line 31, "excluedes" should read --excludes--.
Column 13, line 35, "susceptor" should read --susceptor---.
Column 13, line 45, "ceptorforming" should read --ceptor-forming--.
Column 14, line 4, "mateials" should read --materials--.
Column 14, line 28, "byapplying" should read --by applying--.
Column 14, line 55, "sing" should read --using--.
Column 15, line 3, "skilled" should read --skillet--.
Column 15, line 10, "attach" should read --attack--.
Column 15, line 22, "glended" should read --blended--.
Column 15, line 39, "localied" should read --localized--.
Column 15, line 50, "manganeses" should read --maganeses--.
Column 16, line 19, "ufse" should read --fuse--.
Column 16, line 40 "performed" should read --preformed--.
Column 16, line 41 "performed" should read --preformed--.

UNITED STATES PATENT AND TRADEMARK OFFICE
CERTIFICATE OF CORRECTION

PATENT NO. : 4,800,247

DATED : January 24, 1989

INVENTOR(S) : Schneider et al.

It is certified that error appears in the above-identified patent and that said Letters Patent is hereby corrected as shown below:

Column 16, line 50 "forming" should read --formed--.
Column 16, line 67, "is" should read --in--.
Column 17, line 19, "35" should read --26--.
Column 18, line 6, "susceptorforming" should read --susceptor-forming--.

Signed and Sealed this

Twenty-second Day of August, 1989

Attest:

DONALD J. QUIGG

Attesting Officer

Commissioner of Patents and Trademarks